United States Patent [19]
Sundstrom, Jr.

[11] 3,922,891
[45] Dec. 2, 1975

[54] CLOTHES WASHER SUSPENSION SYSTEM
[75] Inventor: John A. Sundstrom, Jr., Springboro, Ohio
[73] Assignee: General Motors Corporation, Detroit, Mich.
[22] Filed: June 28, 1974
[21] Appl. No.: 483,962

[52] U.S. Cl. .................... 68/23.3; 68/23.7; 210/144
[51] Int. Cl.² ........................................ D06F 35/00
[58] Field of Search ............ 68/23.3, 23.7; 210/364, 210/144; 248/358

[56] References Cited
UNITED STATES PATENTS

| | | | |
|---|---|---|---|
| 2,859,877 | 11/1958 | Sisson | 68/23.3 |
| 3,269,544 | 8/1966 | Brucken et al. | 210/364 |
| 3,422,957 | 1/1969 | Fosler | 210/144 |
| 3,493,118 | 2/1970 | Brucken | 68/23 |

Primary Examiner—Richard E. Aegerter
Assistant Examiner—L. Footland
Attorney, Agent, or Firm—Frederick M. Ritchie

[57] ABSTRACT

A suspension system for a clothes washer with a horizontally osciliatable agitator. The washer has a base with an upwardly facing convex surface and a supported mass with a downwardly facing convex surface. The suspension system includes a self-locating shuttle ring between the convex surfaces and a high rate rubber spring within the shuttle ring which interconnects the convex surfaces to resist twisting and cocking of the supported mass during horizontal oscillations of the agitator and which delimits sidewise movement of the supported mass during shipment of the clothes washer.

5 Claims, 3 Drawing Figures

CLOTHES WASHER SUSPENSION SYSTEM

This invention relates to a suspension system for a domestic appliance and, more particularly, to a suspension system for a clothes washer having a rotatable mass comprising a spin tub and a horizontally oscillatable mass comprising an agitator.

In the washing machine art, several types of suspension systems have been used to reduce transfer of vibration from the movable mass system to the base and casing of the washing machine. This invention is directed to an improved shuttle suspension of the type taught in the U.S. Pat. to Brucken et al. No. 3,269,544 patented Aug. 30, 1966, and in the U.S. Pat. to Brucken No. 3,493,118 patented Feb. 3, 1970. Such shuttle type suspensions utilize a shuttle located between two surfaces in the suspension system designed to provide for a shift of a nodal point during different modes of vibration of the movable mass.

The improved shuttle type suspension system of this invention is adapted for use with a domestic clothes washer which includes an agitator within the spin tub portion of its movable mass system. The agitator is adapted by a drive mechanism to oscillate horizontally within the spin tub. A problem arises in such machines in that the movable mass wants to twist back and forth during agitate. Also, during agitate the movable mass wants to cock to one side in a non-vertical orientation relative to the clothes washer casing. This makes a bad appearance to the user when viewed through the access opening of the washer. Moreover, if the movable mass cocks too far from vertical, it may be so close to the washer casing that the two will bump and cause noise when spin starts. Another bumping problem may occur as the result of sudden jolts during shipment of a clothes washer with shuttle suspension.

Accordingly, it is an object of this invention to provide in a shuttle type suspension for a domestic clothes washer a hat-shaped, rubber cup within the shuttle sufficiently stiff to act as a spring and dampener for restraining the movable mass against excessive sidewise excursions during shipment of the washer, and, during operation of the washer for resisting the torque imparted to the movable mass by horizontal oscillations of the agitator and the tendency of the movable mass to cock or lean.

A further object of this invention is the provision in a shuttle type clothes washer suspension of a high rate rubber spring within the small confines of the shuttle whereby to give the spring a variable rate during shipment of the washer.

Further objects and advantages of the present invention will be apparent from the following description, reference being had to the accompanying drawings wherein a preferred embodiment of the present invention is clearly shown.

Figure 1:
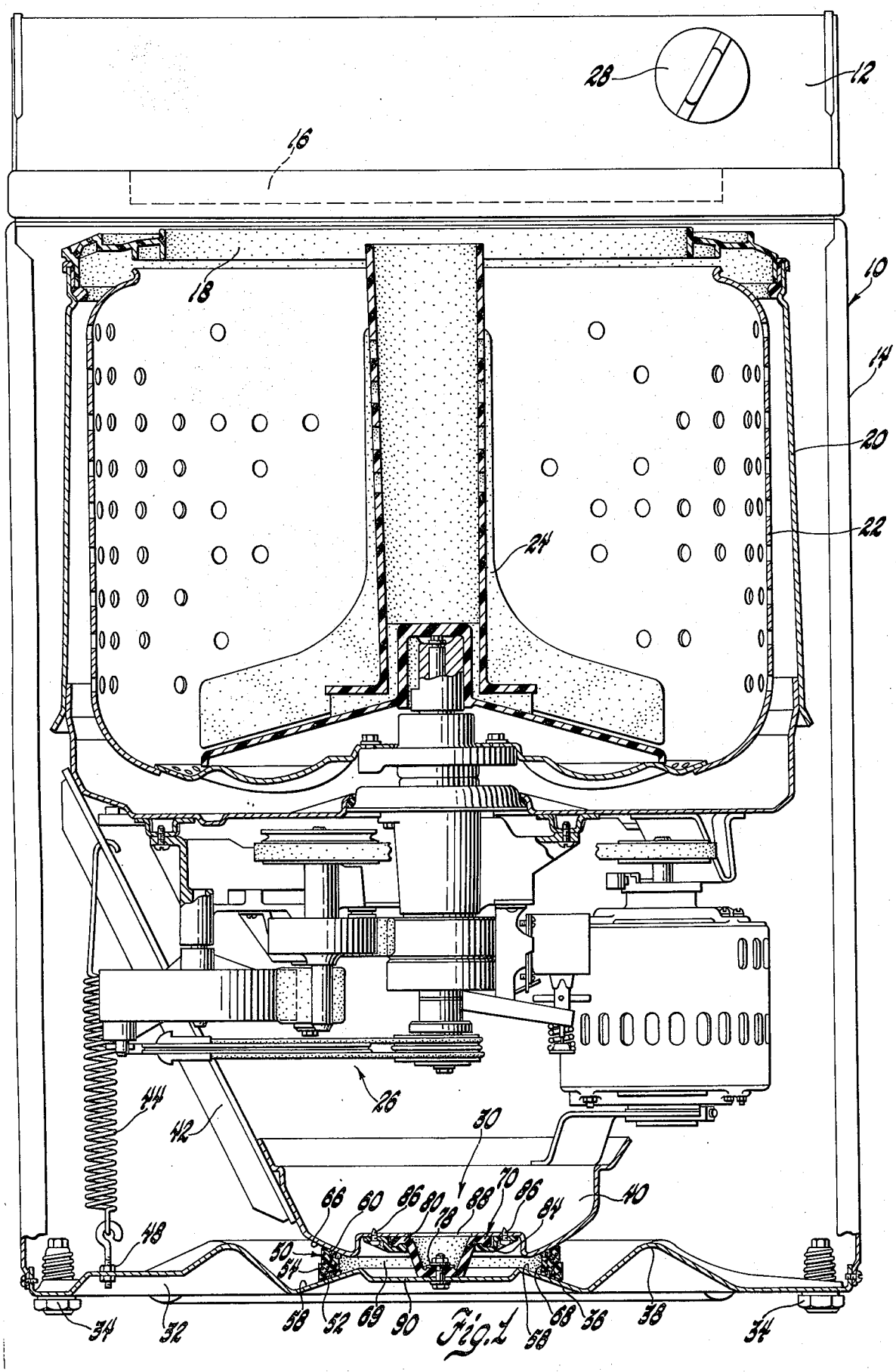
FIG. 1 is a sectional front view partly in elevation of a clothes washer including the suspension system of the present invention.

In accordance with this invention and with reference to FIG. 1, a clothes washer 10 is comprised of a control housing 12 and a casing 14. The casing 14 is provided with an upwardly opening access lid 16 through which clothes are loaded into the washer. Located within the casing 14 is a cylindrical water container or outer tub 20 having an access opening 18 beneath the lid. Concentric with the water container 20 is a perforate inner tub or spin tub 22 which is rotatably mounted with respect to the water container 20. Concentrically mounted within the spin tub 22 is a horizontally oscillatable agitator 24 which operates to circulate or agitate water admitted to the spin tub through a conventional water supply (not shown). Mounted directly below the water container 20 is an agitating and spin mechanism 26. Conventional washer controls and timer means 28 are included on the control housing 12 to selectively admit water or washing fluid to the water container 20 and to control the agitating and spin mechanism 26 so as to selectively horizontally oscillate the agitator 24 or rotate the spin tub 22. A pump (not shown) is utilized to drain water which is in the water container 20 before spin and which is centrifugally removed from the clothes during spin. Further details of the agitating and spin mechanism 26 and the operation thereof are set forth in the U.S. Pat. to Sisson No. 3,772,925, issued Nov. 20, 1973. It should be understood that the above-described arrangement between agitator 24, spin tub 22, water container 20, and mechanism 26 is merely representative of a typical washing machine having a rotatably driven spin tub and a horizontally oscillatable agitator.

For operation of the washing machine 10, clothes, or a washing load, are inserted into the spin tub 22 through the access lid opening 16. A predetermined quantity of water is then supplied to the water container and spin tub. The water container 20, rotatable spin tub 22, agitator 24, and the agitating and spin mechanism 26 are mounted as a unitary movable mass system within the casing 14. The weight of the movable mass is further increased by the clothes and water in the spin tub. It is common in a typical washing machine after agitate to have wet clothes lump into an unbalanced mass in the spin tub, thereby creating a disturbing force on the movable mass system during rotation of the spin tub. This disturbing force causes the movable mass system to gyrate and wobble in a manner to produce substantial lateral forces or disturbances within the casing 14. Moreover, the back and forth swishing of the clothes in response to the horizontal oscillations of the agitator effects a reactive force causing the movable mass system to twist one way, then the other. This invention provides an improved suspension system of the shuttle type taught in the commonly assigned earlier U.S. Pat. Nos. 3,269,544 and 3,493,118.

The improved shuttle type suspension system is shown generally at 30 and includes a base plate or base member 32 of the washing machine casing 14. The base member 32 may be provided with a plurality of leveling feet 34 of the type disclosed in Brucken U.S. Pat. No. 3,575,288, issued Apr. 20, 1971. One foot 34 may be located at each corner of the washing machine. The feet 34 are adjustable so that the washing machine can be leveled when installed. Centrally located in the base 32 is an upwardly facing spherical convex portion 36. The convex portion is formed in the washing machine base. The base 32 is also provided with an annular ridge 38 which, along with the convex portion 36, increases the rigidity of the base 32.

A downwardly facing spherical convex support member 40 is joined to the water container 20 by a plurality, preferably three, of upwardly directed braces or struts 42. Since the spin tub 22, agitator 24, and agitating and spin mechanism 26 are all mounted for movement with the water container 20, the support member 40 supports the entire movable mass through the braces 42. Three vertical springs 44 join, respectively, each of the braces 42 with the base plate 32. In the preferred form, the vertical springs 44 are joined to the base 32 by means of an adjustable connection 48. The adjustable connection 48 is used to vary the tension of the vertical springs 44. The specific adjustable connection shown consists of a pair of nuts and an eye bolt.

Figure 2:
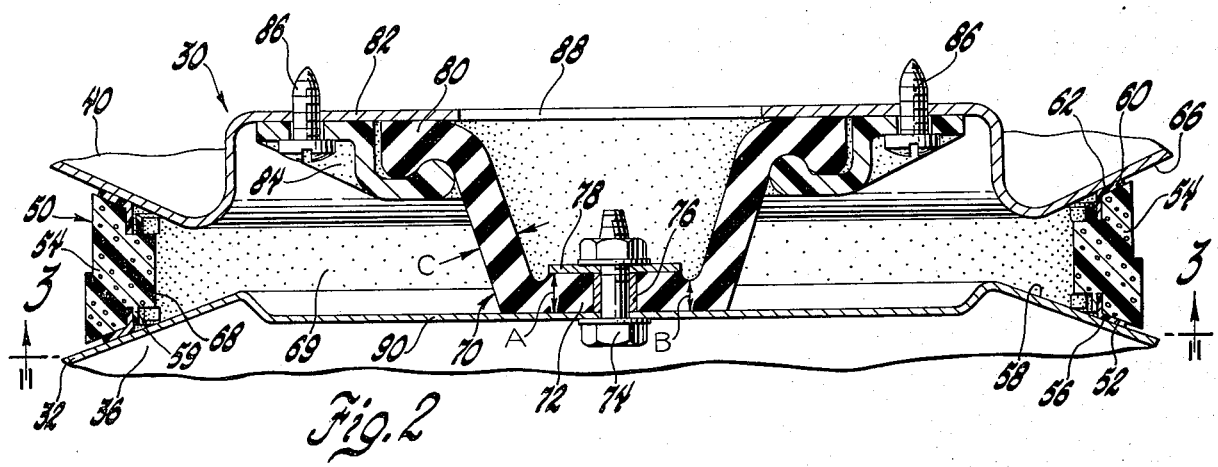
FIG. 2 is an enlarged view of a lower sectional portion of FIG. 1.
Figure 3:
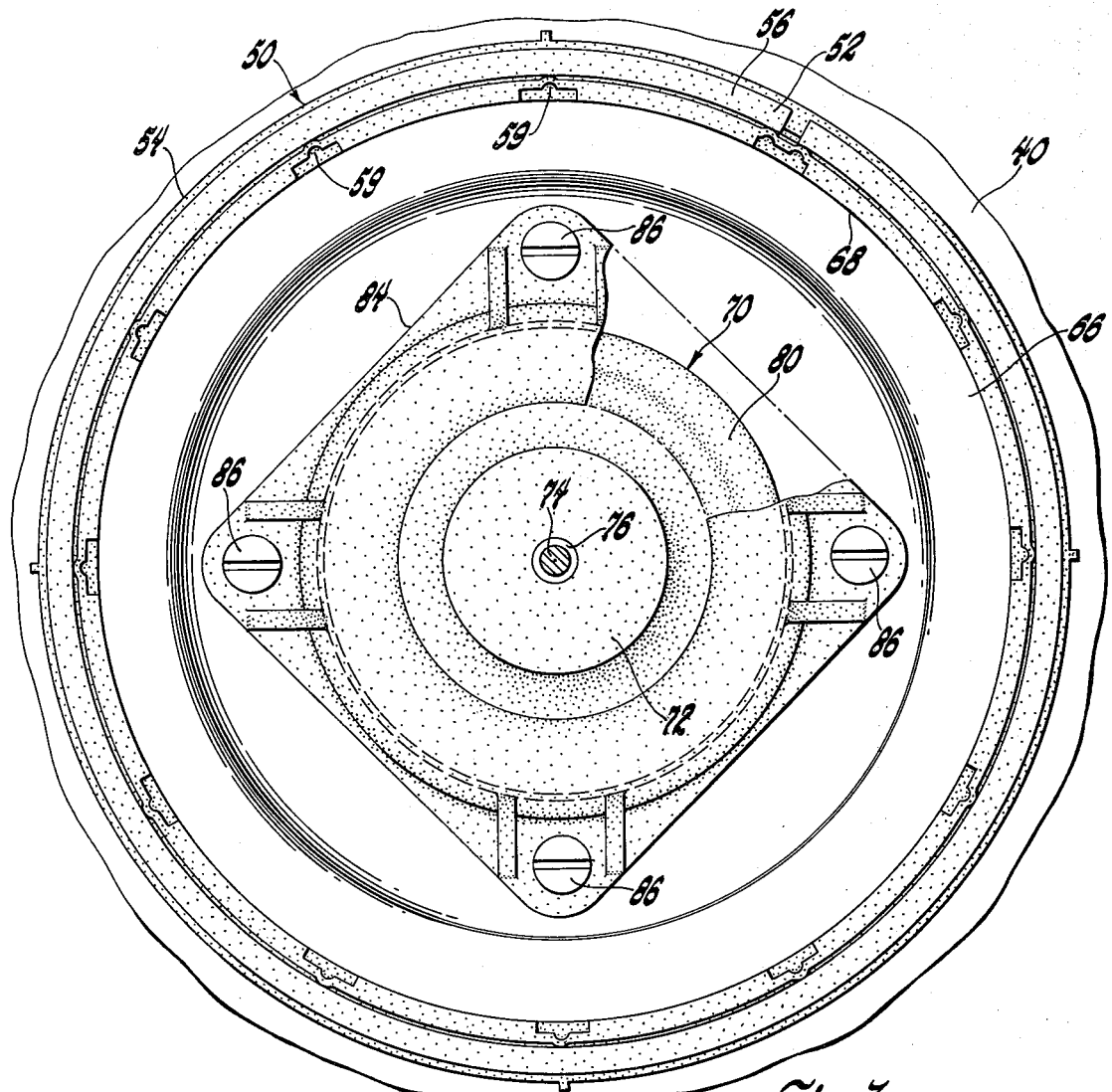
FIG. 3 is a horizontal sectional view with parts broken away taken along line 3 — 3 of FIG. 2.

Located between the convex portion 36 of the base and the support member 40 is an annular shuttle member comprising a snubber ring and bearing assembly 50. As best shown in FIG. 2, the shuttle member 50 has a fiber glass (15%) and molybdenum disulfide (5%) filled Teflon bearing 52, L-shaped in cross-section and circumscribing a foamed polypropylene talc-filled (40%) snubber ring 54. Bearing 52 has a downwardly facing surface 56 which mates with the upwardly facing spherical convex portion 58 of the base to form a first spherically concave interface. The shuttle 50 has a similar Teflon bearing 60 having an upwardly facing spherical concave surface 62 which mates with the downwardly facing convex surface 66 of the support member 40 to form a second spherically concave interface. One leg of each bearing 52, 60 is inserted in a respective circular slot on opposite sides of the snubber ring 54 and staked securely in place as at 59 before the molded snubber ring is cold. As shown in FIGS. 2 and 3, the shuttle 50 is a cylindrical member having a central or radially inner wall 68. The inner wall 68 defines a cavity 69.

As is readily seen, the total weight of the supported or movable mass including the water container and the drive mechanism is totally supported by the shuttle ring 50. The weight is applied through the braces 42 to the support member 40 through the top or second interface of the shuttle ring 50 to the bottom or the first interface, then to the base plate 32 which acts as a fixed support. When the supported mass is caused to move with respect to the fixed support or base, the shuttle member 50 may move with respect to the spherical surface of the convex portion 36 along the first interface. Also, the support member 40 may move with respect to the shuttle ring 50 along the top or second interface. As there is no direct interconnection between the shuttle ring and either the base plate 32 or the support member 40, the shuttle ring is free to move with respect to either or both of these surfaces as forces are applied to the shuttle ring through the first and second interfaces.

In accordance with this invention a spring and snubber damper in the form of a hat-shaped rubber cup 70 is fastened between the facing convex surfaces 58 and 66. The crown portion 72 of the so-called hat is fastened to base 32 by a screw or bolt 74 which extends through a spacer 76 and washer 78. The rubber cup is fastened to the support member 40 by trapping the brim portion 80 of the so-called hat between an upper flat deck portion 82 of the support and a filled, polypropylene damper retainer 84 screwed as at 86 to deck 82.

The improved suspension 30 of this invention provides adaptability in assembly. Where bottom accessibility is called for, the rubber cup 70 may be inverted. Opening 88 in upper deck 82 is eliminated so the upper deck can support crown 72 of the cup 70; retainer 84, in trapping brim 80, is screwed to a flat lower deck portion 90 on base 32; and an opening like opening 88 is placed in the lower deck 90 for access to screw 74.

Tension of vertical springs 44 adds forces to the shuttle ring through the interfaces. Both springs 44 and 70 urge the supported mass toward a centered position with respect to the fixed support of the base plate 32 and tend to hold the supported mass in a vertical or non-cocked orientation when a disturbing force is applied. During shipment of the clothes washer, one of the springs, the rubber cup 70, acts as a movement de-limiting device and takes on a variable spring rate characteristic. A sudden, severe jolt to the shipping carton causes the rubber cup 70 to skew to one side. At first, one side of the cup is in tension — the other side in compression. As the movable mass moves further from center, both sides of the cup are placed in tension. Thus the stretch of the cup with both sides in tension places a limit on the excursion of the movable mass from center, a lower spring rate serving to correct minor jolts and a higher spring rate offsetting severe jolts.

During washer operation, the weight of the supported mass plus the spring forces cause frictional forces at the interfaces when the supported mass is moved with respect to the base plate 32. Such forces, when the washer is empty, are provided primarily by coil springs 44. These frictional forces dampen the movement of the suspended mass with respect to the fixed support by controlling the slip of the bearings 52, 60 along their respective interfaces. The contribution of rubber cup 70 to such dampening is minor and the result of some hysteresis loss in the rubber. Cup 70 is mostly a spring. Thus, suspension 30 includes a single shuttle member which provides two oppositely directed interfaces to control movement of the supported mass with respect to the fixed support and whereby the shuttle member is not tied to either the supported mass or the fixed support except through forces applied to the shuttle member through the two oppositely curved interfaces.

The weight of the supported mass and the spring forces cause a pinching or wedging effect on the shuttle between the two convex surfaces. This pinching action tends to control the lateral movement of the shuttle. The shuttle member is thus independent of both the support member and the base plate of the fixed support.

When the shuttle member is shifted laterally with respect to the fixed support, the vertical springs 44 and rubber cup 70 tend to maintain the axis of the supported mass vertical by pivoting the support member with respect to the now shifted shuttle at the second curved interface. The springs 44 act only against the frictional forces of the second interface and the disturbing force. Except for these frictional forces applied and the restraint to sudden, sideways excursions afforded by snubber damper 70, the support member is free to move with respect to the shuttle member and, thus, there is no outside controlling force resisting the forces of the springs in maintaining the axis of the supported mass in a vertical position. Since the shuttle member is located between two oppositely curved members, the forces of the weight of the suspended mass, springs 44, and snubber damper 70 tend to center the shuttle.

In the clothes washer suspension of this invention, the two opposing convex surfaces 58, 66 are generated by different radii. When the spin tub is rotated with an unbalanced load of clothes, a disturbing force is created which forces the movable or supported mass into a precession or wobble with respect to its fixed support. The amount of this movement is proportional to the amount of the disturbing force and the location of the disturbing force with respect to the center of gravity of the supported mass. However, the two interfaces and the frictional forces applied thereto also affect the movement of the supported mass. By controlling the radii of the interfaces, it is possible to have some control over the frictional forces applied in counteracting the disturbing force. By making the spherical radius of the downwardly facing convex surface 66 less than the spherical radius of the upwardly facing convex surface 58, applied forces effect movement more easily on the upper interface due to a decrease in frictional forces to be overcome. Thus, less resisting force works against forces tending to bias the supported mass into an upright or vertical position.

During agitate, the agitator is oscillated horizontally in a tub full of water and clothes. A reactive torque is induced in the movable mass system that evidences itself in a tendency of the mass to twist back and forth. Snubber damper 70 provides the system with greater stiffness to minimize such twisting.

One suitable working embodiment of the type of suspension shown in FIG. 1 is a clothes washer having an empty supported mass of approximately 108 pounds and a full-load supported mass, including clothes (up to 18 pounds) and water (up to 23 gallons), of up to approximately 209 pounds. This supported mass is centered by vertically oriented coil springs 44 each having a 38 pounds per inch spring rate and a rubber snubber damper 70 having a shore hardness of 50 ±5. Chloroprene rubber is preferred for its resistance to oil. The top interface formed at the bottom convex surface 66 of the support member 40 has a spherical radius of approximately 8 inches. The bottom interface formed at the lower convex surface 58 on the base 32 has a spherical radius of approximately 12 inches. The bottom surface 66 of the convex support member 40 is galvanized and the top surface 58 of the convex portion 36 of the base member 32 carries a layer of porcelain.

The shuttle ring 54 is made of foamed polypropylene having a 40% talc fill. The lower bearing ring 52 is made of approximately 80% polytetrafluoroethylene solid under the trade name "Teflon," plus 15% fiber glass, and 5% molybdenum disulfide. The upper bearing ring 60 is coke filled, a construction which provides less motion along the upper interface with less noise. The shuttle ring 54 has an outside diameter of 7.5 inches and an inside diameter of 6.76 inches, thus providing a radial thickness of 0.370 inch plus draft. The shuttle has a depth of 1.12 inches at its outside diameter. The top and bottom faces of the shuttle ring are inwardly tapered at an angle from the horizontal of approximately 27° and 17°30' respectively.

The rubber cup for the snubber damper 70 has a diameter at its brim of 3.02 inches; a diameter at its crown of 1.50 inches; a crown thickness A of 0.32 inch and a thickness B of 0.24 inch; a height of 1.25 inches and a sidewall thickness C of 0.12 inch. Of these dimensions, the sidewall thickness C is most important. The material is chloroprene rubber having a shore hardness of 50 ± 5.

While the embodiment of the present invention as herein disclosed constitutes a preferred form, it is to be understood that other forms might be adopted.

What is claimed is:

1. In combination with a washing machine having a movable mass including a rotatable spin tub adapted to contain clothes or the like in a washing fluid, an oscillatable agitator in said tub and a mechanism operable to horizontally oscillate said agitator for agitating said clothes or the like in said washing fluid and to rotate said spin tub for centrifugally removing the washing fluid from said clothes or the like durinng operation of said washing machine, a suspension system comprising: a fixed support member having an upwardly facing annular convex portion, a movable support member having a downwardly facing annular convex portion, said movable mass being secured in fixed relationship to said movable support member, an annular shuttle member located between said upwardly facing convex portion and said downwardly facing convex portion and having an internal wall defining a cavity between said support members, at least a portion of each of said convex portions located within said cavity, said shuttle member having an upper bearing portion in mating engagement with said downwardly facing convex portion to form a first interface, said shuttle member having a lower bearing portion in mating engagement with said upwardly facing convex portion to form a second interface, both of said interfaces being located below the center of gravity of said movable mass, said shuttle member being controlled in its movement relative to said fixed support member and said movable support member by forces applied through the interfaces by the pinching effect of said fixed support member and said movable support member, said movement of said shuttle member facilitating the closest possible proximity of said movable support member to said fixed support member within said cavity, and biasing means tending to center and vertically orient said movable mass and resist the twisting thereof, said biasing means including first spring means between said fixed support member and said movable support member outboard of said shuttle member and a second spring means in said cavity between said fixed support member and said movable support member, said second spring means being formed as a hat-shaped rubber cup interconnecting said support members inboard of said shuttle member, the crown of said hat-shaped rubber cup having means for fastening to one of said support members while the brim of said hat-shaped cup has means in combination with the other of said support member to fasten to the other of said support members, whereby during operation of said washing machine both of said spring means tend to center said movable support member with respect to said fixed support member to vertically orient said movable mass while said second spring means tends to counteract the twisting of said movable mass in response to the horizontal oscillations of said agitator, and whereby during shipment of said washing machine said second spring means delimits the sidewise excursions of said movable support member with respect to said fixed support member.

2. In combination with a washing machine having a movable mass including a rotatable spin tub adapted to contain clothes or the like in a washing fluid, an oscillatable agitator in said tub and a mechanism operable to horizontally oscillate said agitator for agitating said clothes or the like in said washing fluid and to rotate said spin tub for centrifugally removing the washing fluid from said clothes or the like during operation of said washing machine, a suspension system comprising: a fixed support member having an upwardly facing annular convex portion, a movable support member having a downwardly facing annular convex portion, said movable mass being secured in fixed relationship to said movable support member, an annular shuttle member located between said upwardly facing convex portion and said downwardly facing convex portion and having an internal wall defining a cavity between said support members, at least a portion of each of said convex portions located within said cavity, said shuttle member comprising a ring having an upper bearing insert portion in mating engagement with said downwardly facing convex portion to form a first interface, the ring of said shuttle member having a lower bearing insert portion in mating engagement with said upwardly facing convex portion to form a second interface, said upper bearing insert portion having one anti-friction characteristic adapted especially for said first interface with said downwardly facing convex portion whereby to provide less motion along said first interface with less noise and said lower bearing portion having another anti-friction characteristic especially adapted for said second interface with said upwardly facing convex portion, both of said interfaces being located below the center of gravity of said movable mass, said shuttle member being controlled in its movement relative to said fixed support member and said movable support member by forces applied through the interfaces by the pinching effect of said fixed support member and said movable support member, said movement of said shuttle member facilitating the closest possible proximity of said movable support member to said fixed support member within said cavity, and biasing means tending to center and vertically orient said movable mass and resist the twisting thereof, said biasing means including first spring means between said fixed support member and said movable suport member outboard of said shuttle member and a second spring means in said cavity between said fixed support member and said movable support member, said second spring means being formed as a hat-shaped rubber cup interconnecting said support members inboard of said shuttle member, the crown of said hat-shaped rubber cup having means for fastening to one of said support members while the brim of said hat-shaped cup has means in combination with the other of said support member to fasten to the other of said support members, whereby during operation of said washing machine both of said spring means tend to center said movable support member with respect to said fixed support member to vertically orient said movable mass while said second spring means tends to counteract the twisting of said movable mass in response to the horizontal oscillations of said agitator, and whereby during shipment of said washing machine said second spring means delimits the sidewise excursions of said movable support member with respect to said fixed support member.

3. The suspension system of claim 2 wherein said downwardly facing convex portion has a galvanized surface and said upper bearing portion is coke-filled polytetrafluoroethylene and wherein said upwardly facing convex portion has a porcelain surface and said lower bearing portion is polytetrafluoroethylene having a fiber glass fill.

4. The suspension system of claim 2 wherein said hat-shaped rubber cup has the characteristic of a variable rate spring during said sidewise excursions by placing one side of said cup in tension while the other side thereof is in compression during a minor sidewise excursion of said movable support member and by placing both sides of said cup in tension during a major sidewise excursion of said movable support member.

5. In combination with a washing machine having a movable mass including a rotatable spin tub adapted to contain clothes in a washing fluid, an oscillatable agitator in said tub and a mechanism operable to horizontally oscillate said agitator for agitating said clothes in said washing fluid and to rotate said spin tub for centrifugally removing the washing fluid from said clothes during operation of said washing machine, a suspension system comprising: a fixed support member having an upwardly facing annular convex portion having a porcelain surface, a movable support member having a downwardly facing annular convex portion having a galvanized surface, said movable mass being secured in fixed relationship to said movable support member, an annular shuttle member located between said upwardly facing convex portion and said downwardly facing convex portion and having an internal wall defining a cavity between said support members, at least a portion of each of said convex portions located within said cavity, said shuttle member having an upper coke-filled polytetrafluoroethylene bearing portion in mating engagement with the galvanized surface of said downwardly facing convex portion to form a first interface, said shuttle member having a lower fiber glass and molybdenum disulfide filled polytetrafluoroethylene bearing portion in mating engagement with the porcelain surface of said upwardly facing convex portion to form a second interface, both of said interfaces being located below the center of gravity of said movable mass, said shuttle member being controlled in its movement relative to said fixed support member and said movable support member by forces applied through the interfaces by the pinching effect of said fixed support member and said movable support member, said movement of said shuttle member facilitating the closest possible proximity of said movable support member to said fixed support member within said cavity, and biasing means tending to center and vertically orient said movable mass and resist the twisting thereof, said biasing means including coil springs vertically oriented between said fixed support member and said movable support member outboard of said shuttle member and a rubber spring and damper in said cavity between said fixed support member and said movable support member, said rubber spring and damper being formed as a hat-shaped rubber cup interconnecting said support members inboard of said shuttle member, the crown of said hat-shaped rubber cup having means for fastening to one of said support members while the brim of said hat-shaped cup has means in combination with the other end of said support member to fasten to the other of said support members by trapping said brim in a sandwich between a portion of the other of said support members and a circumscribing retainer affixed to said other of said support members, whereby during operation of said washing machine said coil springs and said rubber spring and damper tend to center said movable support member with respect to said fixed support member to vertically orient said movable mass while the twisting of said rubber spring and damper tends to counteract the twisting of said movable mass in response to the horizontal oscillations of said agitator, and whereby during shipment of said washing machine said rubber spring and damper delimits the sidewise excursions of said movable support member with respect to said fixed support member, the hat-shaped rubber cup having the characteristic of a variable rate spring during said sidewise excursions by placing one side of said cup in tension while the other side thereof is in compression during a minor sidewise excursion of said movable support member and by placing both sides of said cup in tension during a major sidewise excursion of said movable support member, the hat-shaped rubber cup by the hysteresis loss in said rubber adding to the dampening effect of said bearing portions along said interfaces during operation of said washing machine.

* * * * *

UNITED STATES PATENT AND TRADEMARK OFFICE
CERTIFICATE OF CORRECTION

PATENT NO. : 3,922,891
DATED : December 2, 1975
INVENTOR(S) : John A. Sundstrom, Jr.

It is certified that error appears in the above-identified patent and that said Letters Patent are hereby corrected as shown below:

Column 4, line 7, cancel "Tension" and insert

-- The tension --;

Column 4, line 38, "witih" should read -- with --.

Column 6, line 14, "durinng" should read -- during --.

Column 7, line 52, "member" should read -- members --.

Column 8, line 62, "member" should read -- members --.

Signed and Sealed this twenty-seventh Day of April 1976

[SEAL]

Attest:

RUTH C. MASON
Attesting Officer

C. MARSHALL DANN
Commissioner of Patents and Trademarks